United States Patent
Choi et al.

(10) Patent No.: US 10,670,702 B2
(45) Date of Patent: Jun. 2, 2020

(54) MULTI-CHANNEL LIDAR SCANNER OPTICAL SYSTEM USING MIRROR ROTATION MANNER

(71) Applicant: KOREA ELECTRONICS TECHNOLOGY INSTITUTE, Seongnam-si, Gyeonggi-do (KR)

(72) Inventors: Hyun Yong Choi, Gwangju (KR); Choul Jun Choi, Gwangju (KR); Seung Hun Oh, Gwangju (KR); Hyun Chang Cho, Gwangju (KR)

(73) Assignee: KOREA ELECTRONICS TECHNOLOGY INSTITUTE, Seongnam-si, Gyoenggi-Do (KR)

( * ) Notice: Subject to any disclaimer, the term of this patent is extended or adjusted under 35 U.S.C. 154(b) by 296 days.

(21) Appl. No.: 15/569,538

(22) PCT Filed: Sep. 3, 2015

(86) PCT No.: PCT/KR2015/009324
§ 371 (c)(1),
(2) Date: Oct. 26, 2017

(87) PCT Pub. No.: WO2016/175395
PCT Pub. Date: Nov. 3, 2016

(65) Prior Publication Data
US 2018/0267147 A1    Sep. 20, 2018

(30) Foreign Application Priority Data
Apr. 28, 2015  (KR) .................. 10-2015-0060055

(51) Int. Cl.
*G01C 3/08*  (2006.01)
*G01S 7/481*  (2006.01)
(Continued)

(52) U.S. Cl.
CPC .......... *G01S 7/4817* (2013.01); *G01S 7/4812* (2013.01); *G01S 17/89* (2013.01); *G01S 17/931* (2020.01); *G02B 26/10* (2013.01)

(58) Field of Classification Search
CPC ...... G01S 17/89; G01S 17/936; G01S 7/4817; G01S 7/4812; G02B 26/10
(Continued)

(56) References Cited

U.S. PATENT DOCUMENTS

| 5,337,189 A | 8/1994 | Krawczyk et al. |
| 5,808,727 A | 9/1998 | Katayama |

(Continued)

FOREIGN PATENT DOCUMENTS

| EP | 1503221 A1 | 2/2005 |
| EP | 1956391 A1 | 8/2008 |

(Continued)

OTHER PUBLICATIONS

Extended European Search Report for corresponding international application PCT/KR2015009324 dated Nov. 19, 2018, citing the above references.

(Continued)

*Primary Examiner* — Mark Hellner
(74) *Attorney, Agent, or Firm* — Hauptman Ham, LLP

(57) ABSTRACT

A light detection and ranging (LiDAR) optical system, according to one embodiment of the present invention, comprises: a first mirror which is disposed to make a predetermined first angle with a horizontal plane and has a first hollow; a light source for outputting a pulse laser from the lower portion of the first mirror; a second mirror which is disposed to make a predetermined second angle with the first mirror so that the pulse laser passes through the first hollow and travels to a measurement target; at least two path control mirrors which reflect the pulse laser so that the path (Continued)

of the pulse laser is formed on a reflective surface of the second mirror; a light receiving lens for receiving, from the lower portion of the first mirror, light which has been reflected through the first mirror.

14 Claims, 5 Drawing Sheets

(51) Int. Cl.
  *G01S 17/89* (2020.01)
  *G02B 26/10* (2006.01)
  *G01S 17/931* (2020.01)
(58) Field of Classification Search
  USPC ........................................................ 356/4.01
  See application file for complete search history.

(56) References Cited

U.S. PATENT DOCUMENTS

| | | | | |
|---|---|---|---|---|
| 7,580,117 | B2 * | 8/2009 | Okada | .................. G01S 7/4812 |
| | | | | 356/4.01 |
| 8,305,561 | B2 * | 11/2012 | Mori | ........................ G01C 3/08 |
| | | | | 356/28.5 |
| 2009/0002678 | A1 | 1/2009 | Tanaka et al. | |
| 2012/0249996 | A1 | 10/2012 | Tanaka et al. | |
| 2014/0078489 | A1 | 3/2014 | Hoashi | |

FOREIGN PATENT DOCUMENTS

| | | |
|---|---|---|
| JP | 2008-216238 A | 9/2008 |
| JP | 2014-29317 A | 2/2014 |
| KR | 10-2009-0129797 A | 12/2009 |
| WO | 2015/050310 A1 | 4/2015 |

OTHER PUBLICATIONS

International Search Report for PCT/KR2015/009324 dated Jan. 26, 2016, citing the above reference(s).
Korean Office Action dated Mar. 11, 2016 corresponding to Korean Application No. KR 10-2015-0060055, citing the above reference(s).

\* cited by examiner

MULTI-CHANNEL LIDAR SCANNER OPTICAL SYSTEM USING MIRROR ROTATION MANNER

CROSS REFERENCE TO RELATED APPLICATION

This present application is a national stage filing under 35 U.S.C § 371 of PCT application number PCT/KR2015/009324 filed on Sep. 3, 2015 which is based upon and claims the benefit of priority to Korean Patent Application No. 10-2015-0060055 filed on Apr. 28, 2015 in the Korean Intellectual Property Office. The disclosures of the above-listed applications are hereby incorporated by reference herein in their entirety.

TECHNICAL FIELD

The present invention relates to an optical system of multi LiDAR scanner using mirror rotation.

BACKGROUND ART

Recently, intelligent vehicles and smart cars require pro-active coping functions of the vehicle against outbreak situations. That is, there is a need to ascertain in advance situations menacing safety of a driver or a pedestrian such as recognizing sudden appearance of a pedestrian, detecting in advance an obstacle in a place away from lighting scope in a dark night time, detecting an obstacle when illumination from headlamps is weak due to rainfall, or detecting in advance the road damage.

Scanners are developed to meet these demands, where the scanner is installed at a front side of a vehicle or a windshield to ascertain a front object, to warn a driver in advance that the object lies ahead, and to transmit to an ECU (Electronic Control Unit) of the vehicle a basic image for the vehicle to stop itself or avoid the object, whereby the ECU performs various controls using the image thus obtained. The scanner may also mean a device for obtaining the image.

A RADAR (Radio Detection and Ranging) device has been conventionally used for the scanner. The radar is a radio detection device in which an electromagnetic wave of microwave level (ultrahigh frequency (e.g. approximately 1 cm~10 cm wave) is emitted to an object and a reflected electromagnetic wave is detected and received to measure a distance, a direction and an altitude of the object. The RADAR has been used for a vehicle but disadvantages are that it has not been widely distributed or used for various types of vehicles due to high price.

In order to solve the disadvantages, a scanner using LiDAR (laser imaging detection and ranging) range-finding system has been developed. LiDAR is a distance range measurement technique for measuring distance or an atmospheric phenomenon in which a brief laser pulse (e.g. approximately 1~10 nanoseconds pulse width) is emitted and the reflected light is detected while the time between the emitted pulse and reflected pulse is measured, which is also called a laser RADAR. Time measurement of reflected light is calculated by clock pulse, and the LiDAR has a resolution of 5 m for 30 MHz and 1 m for 150 MHz in the number of vibrations.

Currently, although 360° LiDAR scanner has been developed as a LiDAR mounted on a vehicle, which scans surroundings by allowing a body of the LiDAR to rotate 360°. As a result, a configuration of supplying an electric power to a rotating body must be essentially provided and an electrical rotary joint is a must for transmitting the electric power.

As noted from the foregoing, the conventional 360° LiDAR scanner must include a physical contact structure in order to transmit the electric power to the rotating body, whereby there was generated a problem of durability of optical system itself and reliability of scanned data. Furthermore, price of electrical rotary joint was relatively high and the 360° LiDAR scanner that essentially included the electrical rotary joint had a limit in price reduction.

DETAILED DESCRIPTION OF THE INVENTION

Technical Subject

The technical subject to be solved by the present invention is to provide an optical system of multi LiDAR scanner using mirror rotation configured to miniaturize an entire size by low-priced manufacturing cost compared with the conventional 360° LiDAR scanner.

Another technical subject is to provide an optical system of multi LiDAR scanner using mirror rotation configured to perform 360° scanning by rotating only a mirror without an electrical rotary joint.

Still another technical subject is to provide an optical system of multi LiDAR scanner using mirror rotation configured to simplify and miniaturize an entire structure by integrally manufacturing a light transmitting part and a light receiving part.

Still further technical subject is to provide an optical system of multi LiDAR scanner using mirror rotation so configured as to be miniaturized for easy installation on a small mobile object.

Technical Solution

In one general aspect of the present invention, there is provided an optical system of multi LiDAR scanner using mirror rotation, the system comprising:

a first mirror so arranged as to form a predetermined first angle with a horizontal surface and having a first hollow hole;

a light source configured to output a pulse laser from a bottom surface of the first mirror;

a second mirror so arranged as to form a predetermined second angle with the first mirror in order to allow the pulse laser to advance to a measurement target by passing through the first hollow hole;

at least two path control mirrors to reflect the pulse laser in order to form a light path of the pulse laser using a reflection surface of the second mirror;

a light receiving lens configured to receive, from a bottom surface of the first mirror, a light reflected through the first mirror;

a light detection part configured to convert a light signal received from the light receiving lens to an electric signal; and a motor arranged between the light receiving lens and the first mirror to rotate the first mirror.

Preferably, but not necessarily, the motor may drive the first mirror at 360°.

Preferably, but not necessarily, the at least two path control mirrors may include a third mirror and a fourth mirror disposed at an upper surface of the first mirror, wherein the third mirror may horizontally reflect the pulse laser advancing upwards of the first mirror; and the fourth mirror may reflect the light reflected through the third mirror to a reflection surface of the second mirror.

Preferably, but not necessarily, the light source may output the pulse laser to a direction parallel with the horizontal surface, and the at least two path control mirrors may further include a fifth mirror disposed at a bottom surface of the first mirror to advance the pulse laser to a reflection surface of the third mirror by reflecting, to a direction perpendicular to the horizontal surface, the pulse laser advancing to a direction parallel with the horizontal surface.

Preferably, but not necessarily, the system further comprises a collimation lens configured to increase directivity of the pulse laser outputted from the light source.

Preferably, but not necessarily, the motor may include a second hollow hole configured to allow the light reflected through the first mirror to advance to the light receiving lens.

Preferably, but not necessarily, the predetermined second angle formed by the first mirror and the second mirror may be a right angle (90°).

Preferably, but not necessarily, the system further comprises a controller configured to determine a scan period or a scan angle of the measurement target.

Preferably, but not necessarily, the second mirror may pass through the first hollow hole of the first mirror, and the reflection surface of the second mirror may be realized in the shape of facing the path control mirror lastly reflecting the pulse laser among the at least two path control mirrors, and facing the measurement target.

Preferably, but not necessarily, the first mirror may include the first hollow hole, the first hollow hole being realized in the shape of an ellipse, a square, or a circle, each closed at an outside surface, or an ellipse, a square, a circle, each partially opened at the outside surface.

Preferably, but not necessarily, the light source may be a multichannel light source configured to output at least two pulse lasers corresponding to mutually different channels, and may further include a control mirror configured to control a light path of the at least two pulse lasers by reflecting the at least two pulse lasers.

Preferably, but not necessarily, the control mirror may include a plurality of reflection mirrors configured to individually reflect each of the at least two pulse lasers.

Preferably, but not necessarily, each angle formed by each of the plurality of reflection mirrors and the horizontal surface may be mutually different.

Preferably, but not necessarily, the predetermined first angle may be 45°, the predetermined second angle may be 90°, and an angle formed by the plurality of reflection mirror and the horizontal surface may be enlarged or reduced depending on expansion of channel of the pulse laser outputted from the multichannel light source or an output angle of at least two pulse lasers.

In another general aspect of the present disclosure, there is provided an optical system of multi LiDAR scanner using mirror rotation, the system comprising:

a first mirror so arranged as to form a predetermined first angle with a horizontal surface;

a light source configured to output a pulse laser from a bottom surface of the first mirror;

a second mirror arranged at an upper end of the first mirror to form a predetermined second angle with the first mirror in order to allow the pulse laser to advance to a measurement target;

at least two path control mirrors to reflect the pulse laser in order to form a light path of the pulse laser using a reflection surface of the second mirror;

a light receiving lens configured to receive, from a bottom surface of the first mirror, a light reflected through the first mirror;

a light detection part configured to convert a light signal received from the light receiving lens to an electric signal; and a motor arranged between the light receiving lens and the first mirror to rotate the first mirror, wherein a bottom end of the second mirror and an upper end of the first mirror are directly connected.

Advantageous Effects of the Invention

The advantageous effect of an optical system of multi LiDAR scanner using mirror rotation according to the present disclosure will be explained as below:

According to at least one of exemplary embodiments of the present disclosure, the present disclosure can advantageously miniaturize an entire size over the conventional 360° LiDAR scanner with an inexpensive manufacturing cost.

Furthermore, according to at least one of exemplary embodiments of the present disclosure, the present disclosure can advantageously perform a 360° scanning by rotating only a mirror without an electrical rotary joint.

Still furthermore, according to at least one of exemplary embodiments of the present disclosure, the present disclosure can advantageously simplify and miniaturize an entire structure by integrally manufacturing a light transmitting part and a light receiving part.

Still furthermore, according to at least one of exemplary embodiments of the present disclosure, miniaturization is enabled to allow an easy installation of small mobile object.

BEST MODE

Figure 1:
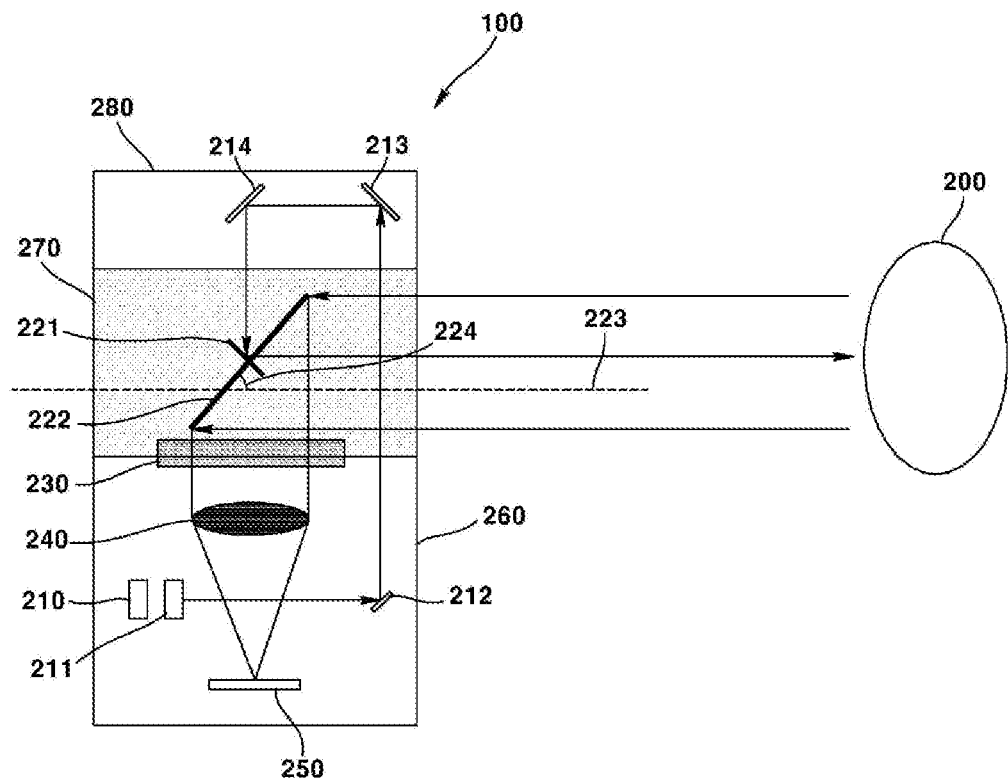
FIG. 1 is a schematic view illustrating an optical system of multi LiDAR scanner using mirror rotation according to an exemplary embodiment of the present disclosure.

Reference will now be made in detail to exemplary embodiments, examples of which are illustrated in the accompanying drawings. Like reference numerals designate like elements throughout the specification, and any overlapping explanations that duplicate one another will be omitted.

In the following detailed description, the suffixes 'module', 'unit' and/or 'part' may be used for elements in order to facilitate the invention. Significant meanings or roles may not be given to the suffixes themselves and it is understood that the 'module', 'unit' and/or 'part' may be used together or interchangeably. In other instances, well-known methods, procedures, components, circuits, and networks have not been described in detail so as not to unnecessarily obscure aspects of the embodiments.

Furthermore, in the following detailed description, numerous specific details are set forth in order to provide a thorough understanding of the present disclosure. However, this disclosure may be embodied in many different forms and should not be construed as limited to any specific structure or function presented throughout this disclosure. Thus, the disclosure described herein is intended to embrace all such alternatives, modifications, variations and applications as may fall within the spirit and scope of the appended claims.

Although the terms first, second, third, A, B, (a) and (b), etc., may be used herein to describe various elements, components, regions, layers and/or sections, these elements, components, regions, layers and/or sections should not be limited by these terms. These terms may be only used to distinguish one element, component, region, layer or section from another region, layer or section.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the terms "a" and "an" are open terms that may be used in conjunction with singular items or with plural items. That is, the singular forms "a," "an," and "the" may be intended to include the plural forms as well, unless the context clearly indicates otherwise.

Throughout the specification, unless explicitly described to the contrary, the word "comprise", "include" and variations such as "comprises", "comprising", "includes" and "including" will be understood to imply the inclusion of stated elements but not the exclusion of any other elements.

Now, exemplary embodiments of the present disclosure will be described in detail with reference to the accompanying drawings. It should be apparent to the skilled in the art that the present invention may be materialized in other particular types within a scope not exceeding the spirit and essential features of the present invention.

FIG. 1 is a schematic view illustrating an optical system of multi LiDAR scanner using mirror rotation according to an exemplary embodiment of the present disclosure.

Referring to FIG. 1, an optical system (100) of multi LiDAR scanner (hereinafter referred to simply as "system") may include a light source (210), a first mirror (222), a second mirror (221), at least two path control mirrors (212, 213, 214), a light receiving lens (240), a light detection part (250) and a motor (230). Furthermore, a collimation lens (211), a cover window (270) and an upper cover (280) may be further included in the optical system (100).

However, it should be apparent to the skilled in the art that FIG. 1 for explaining the system (100) illustrates only elements necessary for schematically introducing the function of the system, and other various elements may be included in the system.

First of all, the light source (210) may output a pulse laser. Furthermore, if necessary, the light source (210) may be arranged on a PCB (Printed Circuit Board, not shown), and the system may further include a collimation lens (211). Here, the collimation lens can increase the directivity of the pulse laser outputted from the light source (210), whereby the pulse laser outputted from the light source (210) is not scattered or dispersed, and can reach a target point. Furthermore, the light source (210) may be arranged at a side lower than that of the first mirror (222). As a result, even if the first mirror (222) is rotated, the light source (210) can output an accurate pulse laser without being affected by vibration generated by the rotation.

The first mirror (222) may be disposed at an upper surface of the light source (210) to form a predetermined first angle (224) with a horizontal surface (223). Furthermore, the first mirror (222) included in the present disclosure may include a first hollow hole, and the pulse laser outputted from the light source (210) may pass through the first hollow hole to reach a measurement target (200). The first mirror (222) may be formed with a round shape or a square shape having a first hollow hole. The first mirror (222) may enable a light reflected from the measurement target and incident to the first mirror (222) to advance to the light receiving lens (240) based on the predetermined first angle formed with the horizontal surface. At this time, the predetermined first angle (224) may be 45°, for example, but the present disclosure is not limited thereto.

The second mirror (221) may be so arranged as to form a predetermined second angle. Furthermore, the second mirror (221) may reflect the pulse laser to allow the pulse laser reached through the at least two path control mirrors (212, 213, 214) to advance to a measurement target (200) by passing through the hollow hole mounted on the first mirror (222). If necessary, the second mirror (221) may be so formed as to create a right angle with the first mirror (222).

To be more specific, the second mirror (221) may be arranged at an upper surface of the first mirror (222) to allow the pulse laser, which is outputted from the light source (210) to pass through the collimation lens (211), and which advances from upward to downward through the path control mirrors (212, 213, 214), to advance to the measurement target by passing through the first hollow hole mounted at the first mirror (222). At this time, the second mirror (221) may be arranged near to the first hollow hole of the first mirror (222). The present disclosure may be limited to the above arrangement if arrangement is made such that the light incident to the second mirror (221) is reflected from the second mirror (221) and is outputted to the measurement target (200) through the first hollow hole of the first mirror (222).

Furthermore, the system may include at least two path control mirrors (212, 213, 214), where the at least two path control mirrors (212, 213, 214) may function to change a light path of the pulse laser outputted from the light source (210) disposed at an area lower than the first and second mirrors (222, 221) to allow the pulse laser to advance from an upside to a downside and to reach a reflection surface of the second mirror (221). As a result, a light path of the pulse laser advancing to the measurement target (200) may be divided and discerned from a light path received by the light detection part (250) disposed at an area lower than the first mirror (222) and the second mirror (221).

Although FIG. 1 illustrates an example where three path control mirrors (212, 213, 214) are arranged, it should be apparent to the skilled in the art that the number of path control mirrors is not limited to three, as long as both the light source (210) and light detection part (250) are disposed under the first mirror (222) and a light advancing to the measurement target (200) and a path of light reflected from the measurement target (200) are discerned.

To be more specific, when it is configured that the light source (210) is arranged at a position of the path control mirror (212), and the pulse laser is outputted vertically upwards, the system of the present disclosure may be realized only with two path control mirrors (213, 214).

The motor (230) may be so driven as to allow the first mirror (222) to rotate to one direction. As a result, the first mirror (222) and the second mirror (221) included in the system of the present disclosure may be rotated at 360° by the motor (230). Therefore, the system may scan an entire plane including all surrounding areas altogether.

The motor (230) illustrated in FIG. 1 may be formed at an inside with a second hollow hole. Here, the second hollow hole may enable the light reflected from the measurement target (200) to be transmitted in full to the light receiving lens (240) and the light detection part (250) after being reflected through the first mirror (222). Although the second hollow hole formed on the motor (230) may take a round shape, the present disclosure is not limited thereto, and the shape may not be limited to the round shape but to any shape, as long as a hollow hole is formed at an inside of the motor (230) and a reflected light can be transmitted to the light receiving lens (240).

After all, the pulse laser outputted from the light source (210) by the rotation of the first mirror (222) may be reflected through the second mirror (221) through the path control mirrors (212, 213, 214) and outputted to the measurement target (200) through the first hollow hole of the first mirror (222). Furthermore, the first mirror (222) can rotate at 360° by the hollow motor (230) such that the pulse laser outputted from the system can be radiated to an entire plane surrounding the system.

Meantime, the pulse laser outputted through the first hollow hole of the first mirror (222) may be reflected from the measurement target (200) and incident on the reflection surface of the first mirror (222). The light reflected by being incident on the reflection surface disposed at a bottom surface of the first mirror may be reflected by the first mirror (222), and concentrated by the light receiving lens (240) through the second hollow hole formed at the motor (230) and may be transmitted to the light detection part (250).

The light detection part (250) may be arranged at a bottom surface of the first mirror (222) and may convert a light incident by passing through the light receiving lens (240) to an electric signal. The converted electric signal may be outputted to the outside. The electric signal detected by the light detection part (250) is an image signal, and may be outputted as an image through an image processing part (not shown), and may be so provided as to allow a user to visually read through a display device (not shown) such as a vehicular navigation.

Meantime, although the reflection surface of the first mirror (222) may be formed to a side where the measurement target (200) is positioned, and the reflection surface of the second mirror (221) may be also formed to a side where the measurement target (200) is located, the present disclosure is not limited thereto, and the reflection surface may be formed at both sides of the first and second mirrors (222, 221), if necessary.

FIG. 1 illustrates that the first and second mirrors (222, 221) are arranged at an upper surface of the motor (230), and the first and second mirrors (222, 221) may become a housing by being surrounded by a cover window (270). Here, the cover window (270) may be preferably formed with a material and a structure through which a light reflected from the pulse laser and the measurement target (200) can easily pass.

Furthermore, at least two path control mirrors (213, 214) in the at least two path control mirrors (212, 213, 214) may be arranged at an upper surface of the first mirror (222), and more specifically, may be housed in an upper cover (280) to be arranged at the upper surface of the first mirror (222). However, the cover window (270) and the upper cover (280) are simply exemplary, and the system may not be limited to these shapes and may be variably formed.

After all, light transmitting parts (210, 211) and the light receiving parts (240, 250) of the system may be arranged on a same block (260) disposed at a bottom surface of the first mirror (222) to thereby dispense with electrical and mechanical coupling structures connecting an upper surface to a bottom surface of the first mirror (222). As a result, the electrical and mechanical reliability can be sufficiently obtained to miniaturize the entire size of the system.

Figure 2A:
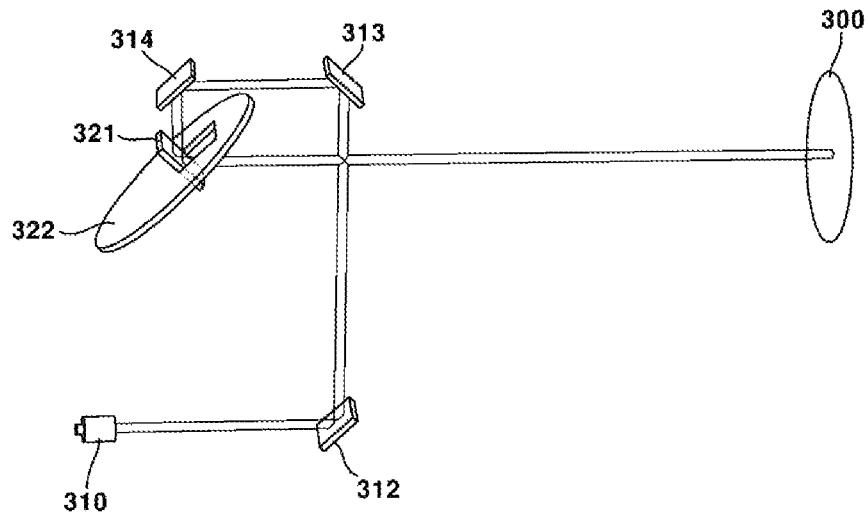
FIG. 2a is a schematic conceptual view illustrating a process of a pulse laser being outputted to a measurement target in an optical system of multi LiDAR scanner using mirror rotation according to an exemplary embodiment of the present disclosure.

FIG. 2a is a schematic conceptual view illustrating a process of a pulse laser being outputted to a measurement target in an optical system of multi LiDAR scanner using mirror rotation according to an exemplary embodiment of the present disclosure.

A first mirror (322), a second mirror (321) and a light path of pulse laser will be described in detail with reference to FIG. 2a. Here, the three path control mirrors (312, 313, 314) are realized, and a first path control mirror (312), a second path control mirror (313) and a third path control mirror (314) are divisibly explained for convenience sake.

First of all, a pulse laser outputted from a light source may reach the first path control mirror (312), where the first path control mirror (312) may reflect the reached pulse laser to the second path control mirror (313) disposed at an upper surface. Furthermore, the second path control mirror (313) may reflect the pulse laser reached by being reflected from the first path control mirror (312) to the third path control mirror (314). In addition, the third path control mirror (314) may reflect the reached pulse laser to the second mirror (321) disposed at a position lower than the third path control mirror (314).

The second mirror (321) may reflect a pulse laser advancing from upward to downward to a measurement target (300). Here, the second mirror (321) may be realized by a shape of passing through a first hollow hole disposed near a center of the first mirror (322), and more specifically, a reflection surface of the second mirror (321) may be formed by passing through the first hollow hole of the first mirror (322), and may be realized by a shape of facing the third path control mirror (314) and the measurement target, through which a light path passing through the first hollow hole disposed at the first mirror (322) may be obtained.

As discussed in the foregoing, the second mirror (321) may be so arranged as to form a right angle with the first mirror (322). Here, the first mirror (322) may function to receive a light reflected from the measurement target (300), and may take an oval, a square or a round shape.

Figure 2B:
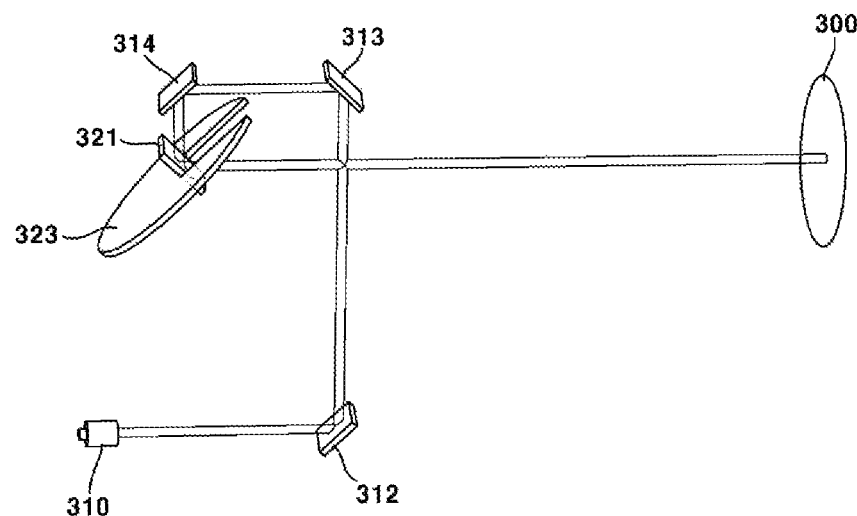
FIGS. 2b and 2c are schematic view illustrating a modification of a first mirror included in an optical system of multi LiDAR scanner using mirror rotation according to an exemplary embodiment of the present disclosure.
Figure 2C:
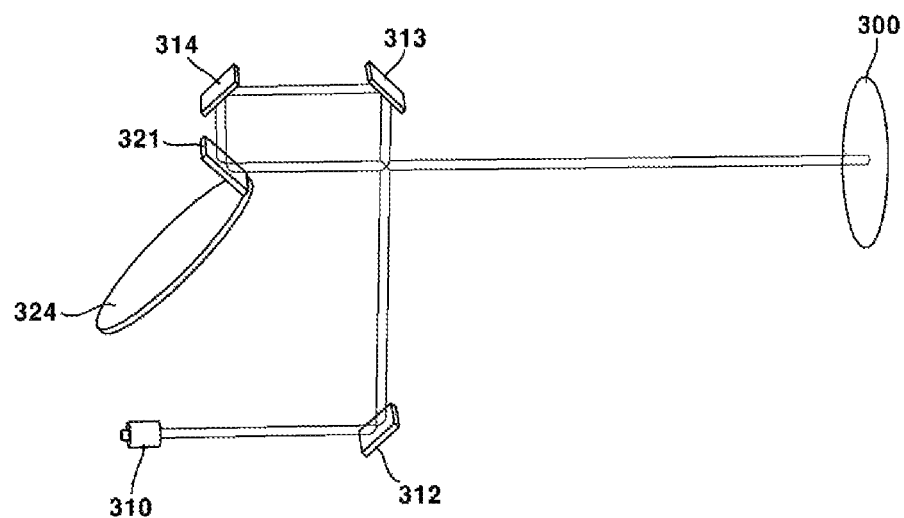

FIGS. 2b and 2c are schematic view illustrating a modification of a first mirror included in an optical system of multi LiDAR scanner using mirror rotation according to an exemplary embodiment of the present disclosure.

Referring to FIG. 2b, a first mirror (323) of the system may include a first hollow hole, and may take an oval shape or a square closed at an outside surface, or not a circular shape but an oval, a square or a round shape partially opened at an outside.

Referring to FIG. 2c, a first mirror (324) of the system may indicates a case where no first hollow hole is included, and where the first mirror (324) may take an oval, a square or a round shape closed at an outside, but may not have a hole as in the first hollow hole. In this case, a lower end of the second mirror (321) may be directly connected to an upper end of the first mirror (324).

Figure 3:
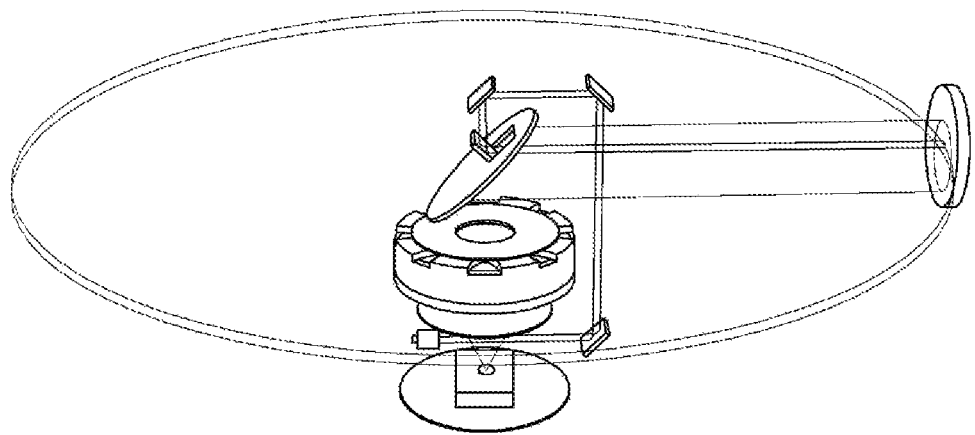
FIG. 3 is a schematic view illustrating an example of scanning a measurement target through an optical system of multi LiDAR scanner using mirror rotation according to an exemplary embodiment of the present disclosure.
Figure 4:
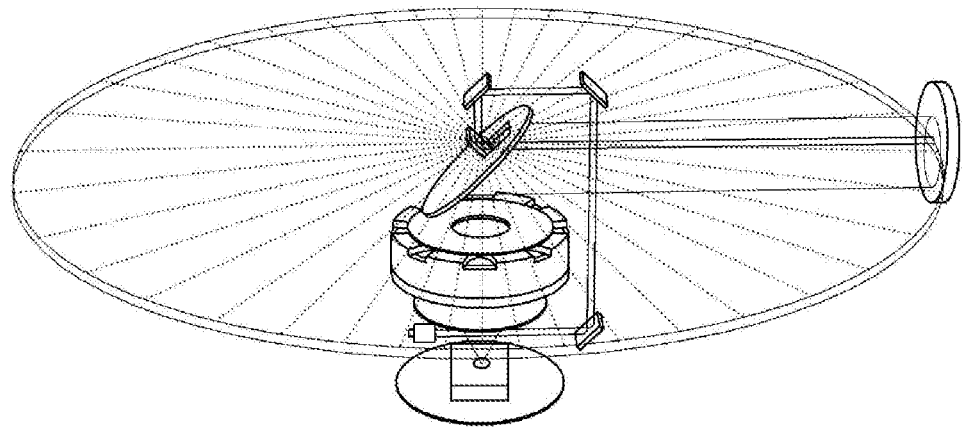
FIG. 4 is a schematic view illustrating an example of scanning by 360° through an optical system of multi LiDAR scanner using mirror rotation according to an exemplary embodiment of the present disclosure.

FIG. 3 is a schematic view illustrating an example of scanning a measurement target through an optical system of multi LiDAR scanner using mirror rotation according to an exemplary embodiment of the present disclosure, and FIG. 4 is a schematic view illustrating an example of scanning by 360° through an optical system of multi LiDAR scanner using mirror rotation according to an exemplary embodiment of the present disclosure.

Referring to FIG. 3, a series of processes can be ascertained from FIG. 3 that a pulse laser outputted from a light transmitting part is reflected from three path control mirrors to reach a reflection surface of a second mirror, reaches a measurement target by passing through a first hollow hole of a first mirror, the light reflected from the measurement target is reflected from the reflection surface of the first mirror, and reaches a light detection part by passing through a second hollow hole of a second hollow hole.

Furthermore, FIG. 4 is a schematic view illustrating that a first mirror rotates by 360° based on the system according to the present disclosure, and a measurement target is scanned at a predetermined time interval. Here, when the predetermined time interval scanning the measurement target is set at a very small level, the system, as a result, can scan an entire plane including all surrounding areas about the system.

Figure 5:
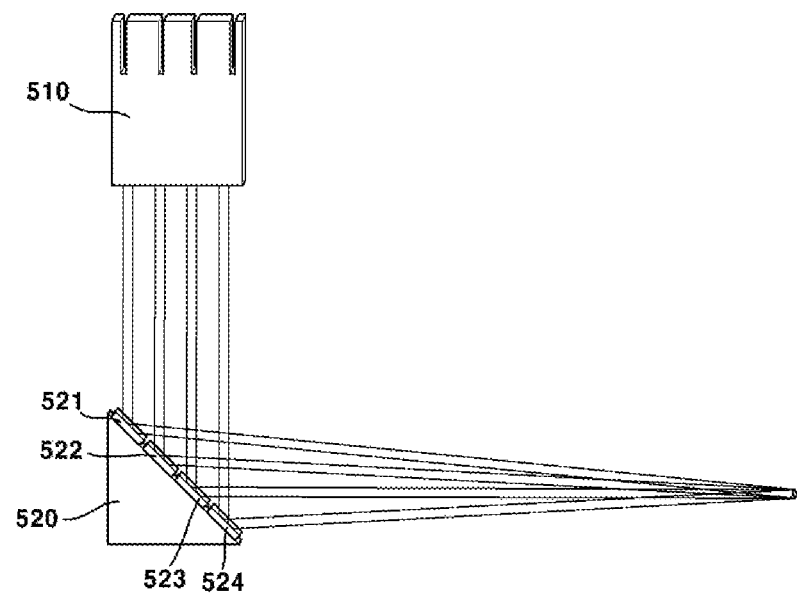
FIG. 5 is a schematic view illustrating a synthetic mirror synthesizing a multi-channel light source and a multi-channel light included in an optical system of multi LiDAR scanner using mirror rotation according to an exemplary embodiment of the present disclosure.

FIG. 5 is a schematic view illustrating a synthetic mirror synthesizing a multi-channel light source and a multi-channel light included in an optical system of multi LiDAR scanner using mirror rotation according to an exemplary embodiment of the present disclosure.

The system may include a multichannel light source (510) outputting lights from a plurality of channels (multichannel). The multichannel light outputted from the multichannel light source (510) may reach a control mirror (520) controlling light paths of the multichannel light source. The control mirror (520) may include a plurality of reflection mirrors (521, 523, 524) individually reflecting each light outputted from the multichannel light source (510). Here, although the plurality of reflection mirrors (521, 523, 524) may be formed at a slope of the control mirror (520), each angle formed by each of plurality of reflection mirrors (521, 523, 524) may be respectively different.

For a detailed example, a first reflection mirror (521) disposed at an uppermost side must reflect a pulse laser reached to itself more downward than a horizontal surface, such that the first reflection mirror (521) may be formed at about 46° with the horizontal surface. Furthermore, each angle formed by second (522) to fourth reflection mirrors (524) with the horizontal surface may be sequentially reduced by 1°. That is, when an angle formed by the first with the horizontal surface is 46°, an angle formed by the second reflection mirror (522) with the horizontal surface may be 45°, an angle formed by the third reflection mirror (523) with the horizontal surface may be 44°, and an angle formed by the fourth reflection mirror (524) with the horizontal surface may be 43°. However, the foregoing detailed angles are one example synthesizing the multichannel light, and the present disclosure is not limited thereto.

Figure 6:
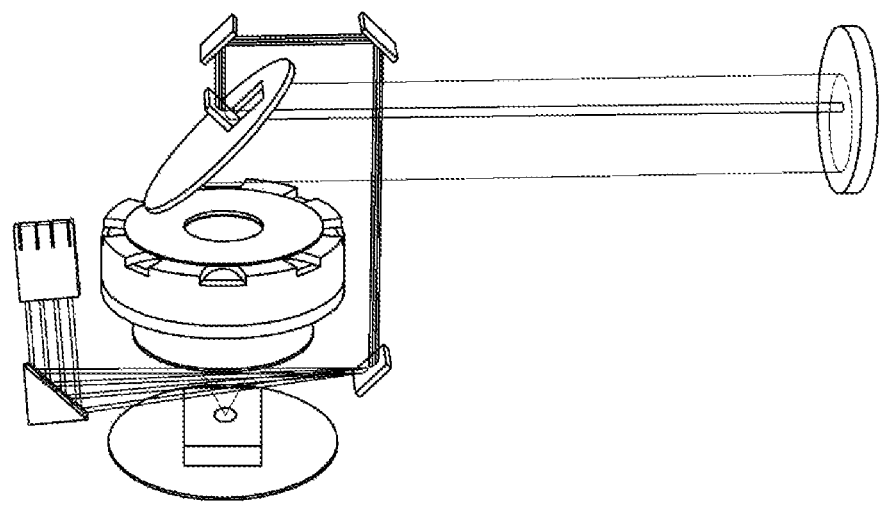
FIG. 6 is a schematic view illustrating an optical system of multi LiDAR scanner using mirror rotation according to another exemplary embodiment of the present disclosure.

FIG. 6 is a schematic view illustrating an optical system of multi LiDAR scanner using mirror rotation according to another exemplary embodiment of the present disclosure. A multichannel light outputted from a multichannel light source may be controlled in light path through a control mirror, and reach a first path control mirror, and advancing paths of the multichannel light thereafter are similar to those explained through FIGS. 1 and 2, such that no further detailed explanation will be omitted.

However, unlike the system of FIGS. 1 and 2, the multi LiDAR scanner of FIG. 6 may include a multichannel light source, and multichannel lights outputted from the multichannel light source may be sequentially reflected from a control mirror and at least two path control mirrors to reach a second mirror, and may be combined in light paths at the second mirror, and may thereafter pass through a first hollow hole to be outputted to a measurement target.

Figure 7:
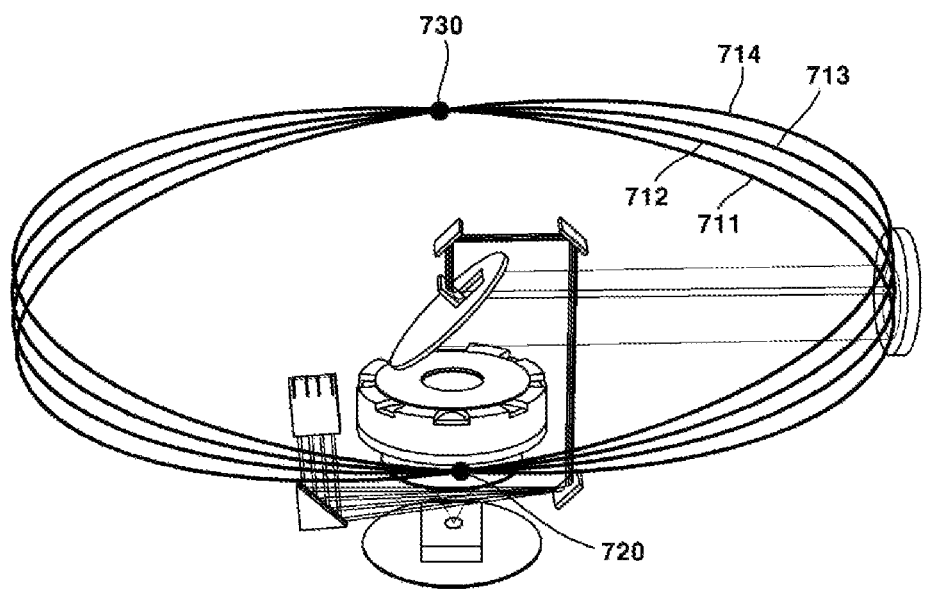
FIG. 7 is a schematic view illustrating an example of scanning by 360° through an optical system of multi LiDAR scanner using mirror rotation according to another exemplary embodiment of the present disclosure.

FIG. 7 is a schematic view illustrating an example of scanning by 360° through an optical system of multi LiDAR scanner using mirror rotation according to another exemplary embodiment of the present disclosure.

In case of an optical system of multi LiDAR scanner using mirror rotation including multichannel light source, light paths (711, 712, 713, 714) after scanning a measurement target may be divided depending on the number of channels as shown in FIG. 7 (FIG. 7 illustrates a light source outputting four channel lights). Furthermore, the light paths (711, 712, 713, 714) after scanning the measurement target may be reversed of upper and lower sides based on 90° and 270°. That is, before displaying a scanned result in an image, data received based on 90° and 270° may need a data treatment processing that performs a reverse processing of upper and lower sides.

After all, the system according to the present disclosure can perform a 360° scanning by rotating only a mirror without an electrical rotary joint, and a light receiving part and a light transmitting part are integrally manufactured on a same block, such that an entire size can be miniaturized with a manufacturing cost lower than that of a conventional 360° LiDAR scanner, and as a result, a smaller mobile object can be easily mounted.

Although the abovementioned embodiments according to the present disclosure have been described in detail with reference to the above specific examples, the embodiments are, however, intended to be illustrative only, and thereby do not limit the scope of protection of the present disclosure. Thereby, it should be appreciated by the skilled in the art that changes, modifications and amendments to the above examples may be made without deviating from the scope of protection of the invention.

The invention claimed is:

1. An optical system of multi laser imaging detection and ranging (LiDAR) scanner using mirror rotation, the system comprising:
   a first mirror configured to form a predetermined first angle with a horizontal surface and having a first hollow hole;
   a light source configured to output a pulse laser from a bottom surface of the first mirror;
   a second mirror so arranged as to form a predetermined second angle with the first mirror in order to allow the pulse laser to advance to a measurement target by passing through the first hollow hole;
   at least two path control mirrors configured to reflect the pulse laser in order to form a light path of the pulse laser using a reflection surface of the second mirror;
   a light receiving lens configured to receive, from a bottom surface of the first mirror, a light reflected through the first mirror;
   a light detection part configured to convert a light signal received from the light receiving lens to an electric signal; and
   a motor configured to arrange between the light receiving lens and the first mirror to rotate the first mirror,
   wherein
   the at least two path control mirrors comprises a third mirror and a fourth mirror disposed at an upper surface of the first mirror,
   the third mirror is configured to horizontally reflect the pulse laser advancing upwards of the first mirror, and
   the fourth mirror is configured to reflect the light reflected through the third mirror to a reflection surface of the second mirror.

2. The optical system of claim 1, wherein the motor is configured to drive the first mirror at 360°.

3. The optical system of claim 1, wherein
   the light source is configured to output the pulse laser to a direction parallel with the horizontal surface, and
   the at least two path control mirrors further includes a fifth mirror configured to dispose at a bottom surface of the first mirror to advance the pulse laser to a reflection surface of the third mirror by reflecting, to a direction perpendicular to the horizontal surface, the pulse laser advancing to a direction parallel with the horizontal surface.

4. The optical system of claim 1, further comprising a collimation lens configured to increase directivity of the pulse laser outputted from the light source.

5. The optical system of claim 1, wherein the motor includes a second hollow hole configured to allow the light reflected through the first mirror to advance to the light receiving lens.

6. The optical system of claim 1, wherein the predetermined second angle formed by the first mirror and the second mirror is a right angle (90°).

7. The optical system of claim 1, further comprising a controller configured to determine a scan period or a scan angle of the measurement target.

8. The optical system of claim 1, wherein the second mirror is configured to pass through the first hollow hole of the first mirror, and the reflection surface of the second mirror is configured to be realized in the shape of facing the path control mirror lastly reflecting the pulse laser among the at least two path control mirrors, and facing the measurement target.

9. The optical system of claim 1, wherein the first mirror includes the first hollow hole, the first hollow hole being realized in the shape of an ellipse, a square, or a circle, each closed at an outside surface, or an ellipse, a square, a circle, each partially opened at the outside surface.

10. The optical system of claim 1, wherein the light source is a multichannel light source configured to output at least two pulse lasers corresponding to mutually different channels, and further includes a control mirror configured to control a light path of the at least two pulse lasers by reflecting the at least two pulse lasers.

11. The optical system of claim 10, wherein the control mirror includes a plurality of reflection mirrors configured to individually reflect each of the at least two pulse lasers.

12. The optical system of claim 11, wherein each angle formed by each of the plurality of reflection mirrors and the horizontal surface is mutually different.

13. The optical system of claim 12, wherein the predetermined first angle is 45°, the predetermined second angle is 90°, and an angle formed by the plurality of reflection mirror and the horizontal surface is enlarged or reduced depending on expansion of channel of the pulse laser outputted from the multichannel light source or an output angle of at least two pulse lasers.

14. An optical system of multi laser imaging detection and ranging (LiDAR) scanner using mirror rotation, the system comprising:
   a first mirror configured to form a predetermined first angle with a horizontal surface;
   a light source configured to output a pulse laser from a bottom surface of the first mirror;
   a second mirror arranged at an upper end of the first mirror to form a predetermined second angle with the first mirror in order to allow the pulse laser to advance to a measurement target;
   at least two path control mirrors configured to reflect the pulse laser in order to form a light path of the pulse laser using a reflection surface of the second mirror;
   a light receiving lens configured to receive, from a bottom surface of the first mirror, a light reflected through the first mirror;
   a light detection part configured to convert a light signal received from the light receiving lens to an electric signal; and
   a motor configured to arrange between the light receiving lens and the first mirror to rotate the first mirror, wherein a bottom end of the second mirror and an upper end of the first mirror are directly connected,
   wherein
   the at least two path control mirrors comprises a third mirror and a fourth mirror disposed at an upper surface of the first mirror,
   the third mirror is configured to horizontally reflect the pulse laser advancing upwards of the first mirror, and
   the fourth mirror is configured to reflect the light reflected through the third mirror to a reflection surface of the second mirror.

* * * * *